(12) United States Patent
Ortgiesen et al.

(10) Patent No.: US 12,198,569 B2
(45) Date of Patent: Jan. 14, 2025

(54) INTELLIGENT HAIR CLIPPER TRAINING SYSTEM

(71) Applicant: WAHL CLIPPER CORPORATION, Sterling, IL (US)

(72) Inventors: Elizabeth Rose Ortgiesen, Dixon, IL (US); Tyler Alan Dayton Tichler, Sterling, IL (US); Austin Luke Rose, St. Charles, IL (US); Matthew Jason Bowers, Dixon, IL (US); David Joseph Todd, Polo, IL (US)

(73) Assignee: WAHL CLIPPER CORPORATION, Sterling, IL (US)

(*) Notice: Subject to any disclaimer, the term of this patent is extended or adjusted under 35 U.S.C. 154(b) by 900 days.

(21) Appl. No.: 17/243,162

(22) Filed: Apr. 28, 2021

(65) Prior Publication Data

US 2021/0343181 A1    Nov. 4, 2021

Related U.S. Application Data

(60) Provisional application No. 63/017,340, filed on Apr. 29, 2020.

(51) Int. Cl.
| | |
|---|---|
| *G09B 19/24* | (2006.01) |
| *A45D 44/14* | (2006.01) |
| *B26B 19/20* | (2006.01) |
| *B26B 19/38* | (2006.01) |

(52) U.S. Cl.
CPC ............ *G09B 19/24* (2013.01); *A45D 44/14* (2013.01); *B26B 19/205* (2013.01); *B26B 19/388* (2013.01)

(58) Field of Classification Search
CPC ..... B26B 19/388; B26B 19/025; A45D 44/14; G09B 19/24
See application file for complete search history.

(56) References Cited

U.S. PATENT DOCUMENTS

| | | |
|---|---|---|
| 2006/0073448 A1 | 4/2006 | Nita |
| 2007/0214654 A1* | 9/2007 | Chen ...................... B26B 19/06 30/223 |
| 2012/0216411 A1 | 8/2012 | Wevers et al. |
| 2013/0021460 A1 | 1/2013 | Burdoucci |
| 2014/0115901 A1 | 1/2014 | Liao |
| 2015/0197016 A1 | 7/2015 | Krenik |
| 2017/0129113 A1 | 5/2017 | Vonk et al. |
| 2019/0061183 A1 | 2/2019 | Neyer et al. |
| 2019/0232510 A1 | 8/2019 | Zandsteeg et al. |
| 2019/0358835 A1 | 11/2019 | Rao Ganesh et al. |

OTHER PUBLICATIONS

International Search Report and Written Opinion received for PCT/US2021/029396, mailed Aug. 3, 2021.

* cited by examiner

*Primary Examiner* — Kesha Frisby
(74) *Attorney, Agent, or Firm* — Greer, Burns & Crain, Ltd

(57) ABSTRACT

An intelligent hair clipper training system includes a housing having hair associated therewith, an electric hair clipper for cutting the hair on the housing, at least one comb associated with the hair clipper, a sensor array for detecting a position of the electric hair clipper relative to the housing, an indicator arrangement for indicating different zones of hair on the housing, and a control arrangement configured to interpret positional data provided by the sensor array and cause the indicator arrangement to illuminate one or more of the zones of hair on the housing.

17 Claims, 6 Drawing Sheets

INTELLIGENT HAIR CLIPPER TRAINING SYSTEM

RELATED APPLICATION

The present application claims the benefit under 35 USC 119(e) of U.S. Provisional Application No. 63/017,340 filed Apr. 29, 2020, the entire contents of which are incorporated by reference herein.

FIELD OF THE INVENTION

The present invention relates generally to systems and methods for hair cutting instruction.

BACKGROUND

Cutting hair is an art form. It takes a significant amount of practice and training for an individual providing hair cutting services to perfect their craft. Many individuals may practice on mannequin heads having real or synthetic hair affixed thereon. Such hair may be permanently affixed to the mannequin head, or it may be replaceable. While such mannequin heads have provided a tried and true method for the barber or hair stylist to practice and enhance their skill, they are not without their drawbacks.

Indeed, such mannequin heads are simple plastic constructions with hair affixed thereto. They provide a great practice medium but are void of any facets of teaching or instruction. While such mannequin heads serve as a medium for the barber or hair stylist to practice on, they do not provide any feedback to the barber or hair stylist in terms of whether they are cutting hair correctly, as the act is being performed. Such feedback is of importance, especially given the complexity of many contemporary haircuts.

For example, a fade haircut requires cutting a person's hair at differing lengths while progressing vertically along the scalp from the neckline to near the top of the head. Adding complexity to this type of haircut is the need to blend boundary regions between adjacent areas of differing lengths to achieve a smooth transition in hair length. Such a haircut takes time to master, and even with contemporary mannequin heads as training tools, one may still find it difficult to perfect the fade haircut.

Thus, there is a need for an improved training system for cutting hair.

SUMMARY

In one aspect, the invention provides an electric hair clipper training system. An embodiment of such a system includes a housing having hair associated therewith, an electric hair clipper for cutting the hair on the housing, and at least one comb associated with the hair clipper. This embodiment also includes a sensor array for detecting a position of the electric hair clipper relative to the housing, an indicator arrangement for indicating different zones of hair on the housing, and a control arrangement configured to interpret positional data provided by the sensor array and cause the indicator arrangement to illuminate one or more of the zones of hair on the housing.

In embodiments according to this aspect, the housing is a mannequin head and includes an interior space. The sensor array and indicator arrangement are contained within the interior space. The mannequin head can include a plurality of openings such that light produced by the indicator arrangement can diffuse through an outer wall of the mannequin head.

In embodiments according to this aspect, the electric hair clipper includes a taper lever for adjusting a blade gap between a movable blade and a stationary blade of the electric hair clipper. The taper lever is associated with a taper lever position detection arrangement that includes a plurality of contacts arranged such that a contact of the taper lever can form an electrical contact with each of the plurality of contacts.

In embodiments according to this aspect, the at least one comb includes an RFID tag affixed thereon, for uniquely identifying the at least one comb to an RFID reader of the control arrangement. The at least one comb can include a plurality of combs each having an RFID tag uniquely distinguishing the plurality of combs from one another. The control arrangement can be configured to detect which one of the plurality of combs is attached to the electric hair clipper.

In embodiments according to this aspect, the sensor array includes at least one sensor strip having a plurality of Hall effect sensors mounted on a base of the at least one sensor strip. Further, the at least one sensor strip can include a plurality of sensor strips.

In embodiments according to this aspect, the indicator arrangement can include at least one indicator strip that includes a plurality of LED lights mounted on a base of the at least one indicator strip. Further, the at least one indicator strip includes a plurality of indicator strips.

In embodiments according to this aspect, the control arrangement includes a processor, an RFID reader in communication with the processor for receiving an RFID signal from an RFID tag of the at least one comb, and a receiver for receiving a wireless signal from the electric hair clipper.

In embodiments according to this aspect the wireless signal from the electric hair clipper includes an indication of a taper lever position of a taper lever of the electric hair clipper. The control arrangement is configured to compare the wireless signal corresponding to the taper lever position and the RFID signal to the position of the electric hair clipper relative to the mannequin head.

In another aspect, the invention provides a method of providing hair cutting training using a hair clipper training system. The hair clipper training system including a housing having hair associated therewith, an electric hair clipper for cutting the hair on the housing, at least one comb associated with the hair clipper, a sensor array for detecting a position of the electric hair clipper relative to the housing, an indicator arrangement for indicating different zones of hair on the housing, and a control arrangement configured to interpret positional data provided by the sensor array and cause the indicator arrangement to illuminate one or more of the zones of hair on the housing. An embodiment of such a method includes illuminating a first zone of hair on the housing using the indicator arrangement, detecting whether the electric hair clipper is in proximity to the first zone via the sensor array, determining whether a correct comb is attached to the electric hair clipper, detecting whether a taper lever of the electric hair clipper is in a correct position, providing an indication, via the indicator arrangement, when the electric hair clipper is not in proximity to the first zone.

DETAILED DESCRIPTION

Figure 1:
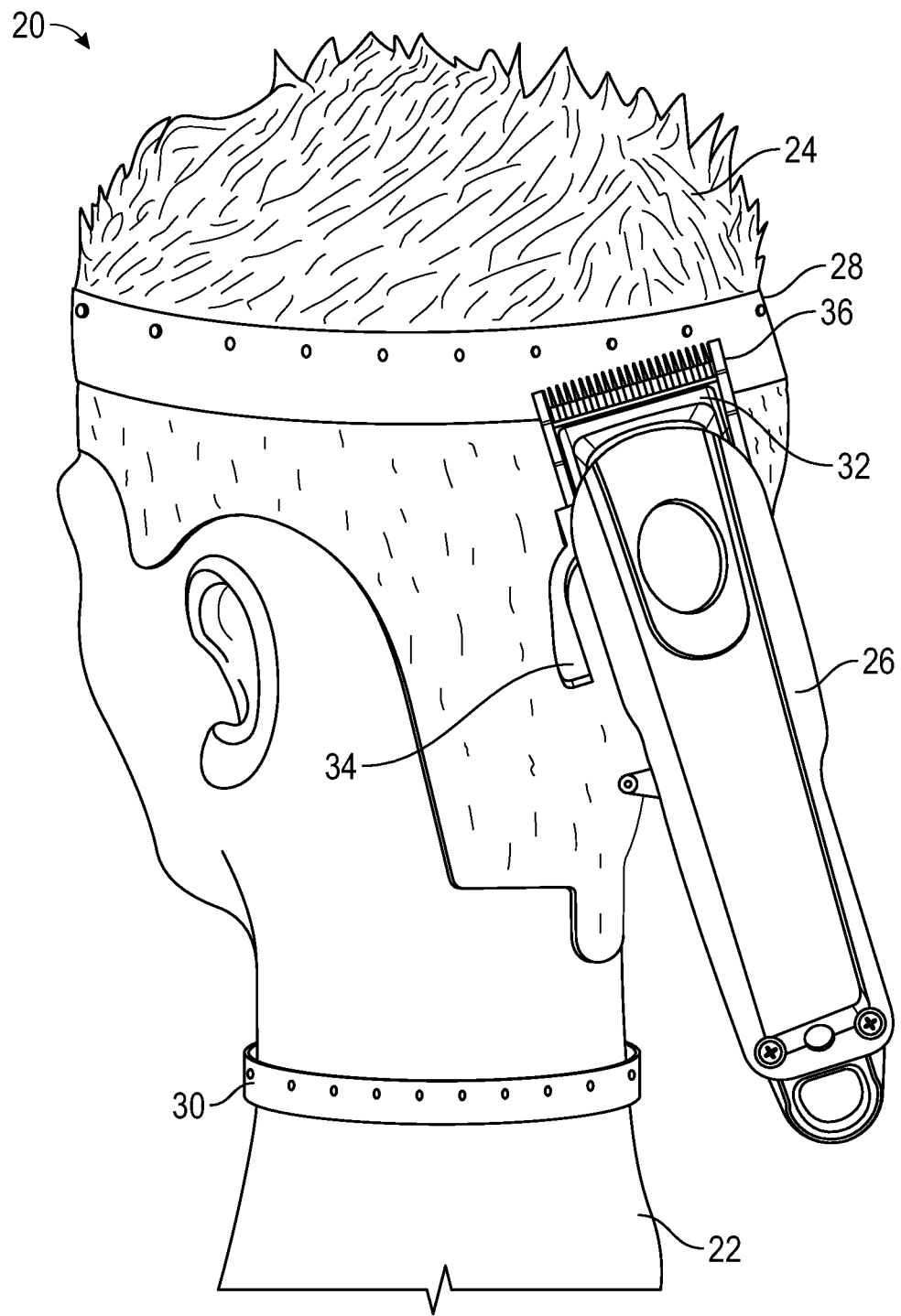
FIG. 1 is a perspective view of an exemplary embodiment of an intelligent hair clipper training system according to the teachings of the invention.

Turning now to the drawings, the same illustrate an exemplary embodiment of an intelligent hair clipper training system 20 (referred to herein as "system" for brevity) constructed in accordance with the teachings herein. With reference to FIG. 1, system 20 includes a housing in the form of a mannequin head 22 with hair 24 affixed thereto. System 20 also includes an electric hair clipper 26 (referred to herein as a "clipper").

As will be explained by the following, system 20 is operable to provide an indication, generally depicted as an illuminated area 28, to a user of where to cut hair on mannequin head 22 at a given length. System 20 may also be configured to provide an additional indication via an indicator 30, corresponding to whether clipper 26 is in its correct configuration, and in the correct location, relative to the zone of hair to be cut on mannequin head 22.

It is contemplated, however, that indicator 30 may be omitted. In such an instance, the indication of as to whether clipper 26 is in its correct configuration and in the correct location may be provided by the same structure providing illuminated area 28, as described in greater detail below. In either case, such a configuration advantageously allows for real-time feedback as a user cuts hair 24. Further, it is also contemplated herein that the housing may take on other forms other than a mannequin head. For example, the housing may be in the form of another body part of a mannequin. In general, the housing contemplated herein may be structure that is sufficient to have hair attached to it.

Still referring to FIG. 1, clipper 26 includes a bladeset 32 for cutting hair 24. A taper lever 34 is operable to control a blade gap of bladeset 32, which in turns provides fine adjustment of the length of hair 24 that is cut by bladeset 32. System 20 also includes a comb. Such a comb may be embodied as one or more combs 36 mountable on clipper 26. Combs 36 are also used to govern the length of hair 24 that is cut by bladeset 32, primarily by spacing bladeset 32 a predefined distance away from a scalp surface upon which hair 24 is situated on. Alternatively, a comb can include a single comb that is movable relative to clipper 26 to adjust a length of hair cut.

As will be explained in greater detail below, system 20 is operable to progress a user through various zones of hair 24. Each zone has a comb 36 associated with it. In other words, each zone has a different hair length in that zone relative to the other zones. The zone corresponding to the area the user should be cutting will be illuminated, as is shown for example by illuminated zone 28. This illumination provides the user with an instruction of where they should be cutting hair.

System 20 is also operable to verify that the user is using the correct comb 36 for that zone, as well as a whether taper lever 34 is in its correct taper lever position. System 20 is also operable to indicate to the user whether the user has strayed outside of the zone the user should be working in, and/or whether the user has attached an incorrect comb 36 or does not have taper lever 34 in the correct position. Such a configuration is particularly helpful for producing the aforementioned fade haircut. With the foregoing general introduction in hand, a description of the particulars of system 20 will be provided hereafter.

Figure 2:
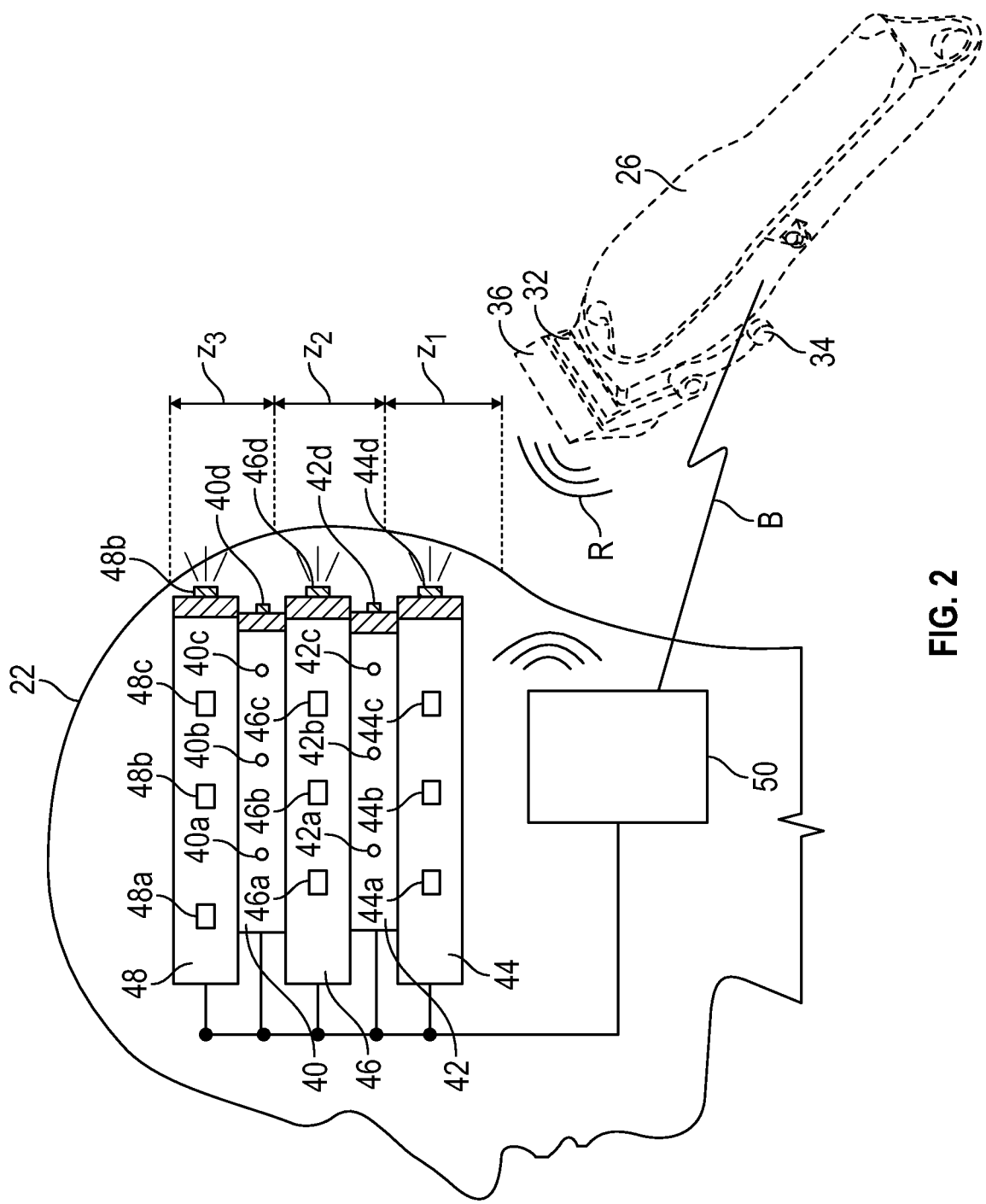
FIG. 2 is a partial side cross section of the system of FIG. 1.

Turning now to FIG. 2, mannequin head 22 is illustrated in a cross section. As can be seen in this view, mannequin head 22 includes a generally hollow interior which houses a sensor array that includes at least one sensor strip, and in the particular illustrated embodiment, a pair of sensor strips 40, 42. Sensor strips 40, 42 may be provided as generally flexible members so that they assume the general shape of the interior of mannequin head 22, which may be generally spherical. Sensor strips 40, 42 may be attached directly to the interior surface of mannequin head 22 defining the interior space thereof, or alternatively may be mounted to a separate mounting structure. Sensor strips 40, 42 generally extend along the same area that hair 24 extends along.

Sensor strips are designed to detect a spatial position of clipper 26 relative to mannequin head 22. To achieve this, sensor strip 40 is provided with a plurality of position sensors 40a, 40b, 40c, 40d affixed to a base thereof. These position sensors 40a-d may, for example, may be embodied as Hall effect sensors. In such an instance, clipper 26 may be fitted with a magnet (not shown) so that Hall effect sensors 40a-d may detect when clipper 26 is in proximity to select ones of the sensors.

Likewise, sensor strip 42 may also include Hall effect sensors 42a, 42b, 42c, and 42d mounted to a base thereof. It should be noted that the number of sensors shown is non limiting. Fewer or greater sensors may be included on each sensor strip 40, 42 depending on the type of sensor used and the accuracy of position detection of clipper 26 desired.

While Hall effect sensors have been described herein, it is also contemplated that each sensor strip 40, 42 could utilize other types of sensors, e.g. temperature sensors, audible sensors, vibration sensors, etc. It is contemplated herein that any sensor capable of detecting when clipper 26 is in proximity thereto could be utilized.

As can be seen from inspection of FIG. 2, sensor strips 40, 42 are arranged in planes parallel to one another. This arrangement defines three distinct hair cutting zones $Z_1$, $Z_2$, $Z_3$. When clipper 26 is at the same height or below sensor strip 42, system 20 will consider clipper 26 as being in zone $Z_1$ given that the signal produced by sensors 42a-d will be considerably greater than that of sensors 40a-d. When clipper 26 is between sensor strips 40, 42, system 20 will consider clipper 26 in zone $Z_2$ as the signal produced by sensors 40a-d will be generally the same or only slightly different than the signal produced by sensors 42a-d. When clipper 26 is at or above sensor strip 40, system 20 will consider clipper 26 as being in zone $Z_3$ given that the signal produced by sensors 40a-d will be considerably greater than that of sensors 42a-d. The foregoing methodology is how the position of clipper 26 relative to mannequin head 22 is determined.

While two sensor strips 40, 42 are shown, it is contemplated of course that fewer or greater sensor strips could be employed to correspondingly define fewer or greater zones. For fade haircuts, particularly the so-called "bald fade" haircut, the applicant has found that three zones are ideal.

An indicator arrangement including at least one indicator strip, and in the illustrated embodiment, a plurality of indicator strips 44, 46, 48. Indicator strips are configured to illuminate a corresponding zone $Z_1$, $Z_2$, $Z_3$ to provide a user with an indication of the zone in which they should cut hair in. In the illustrated embodiment, indicator strip 44 is positioned to illuminate zone $Z_1$, indicator strip 46 is positioned to illuminate zone $Z_2$, and indicator strip 48 is positioned to illuminate zone $Z_3$. Indicator strip 44 includes a plurality of LED lights 44a, 44b, 44c, 44d mounted to a base thereof. Indicator strip 46 includes a plurality of LED lights 46a, 46b, 46c, 46d mounted to a base thereof. Indicator strip 48 includes a plurality of LED lights 48a, 48b, 48c, 48d mounted to a base thereof. It is contemplated that the LED lights of each indicator strip 44, 46, 48 may all be illuminated at one time to thereby illuminate the entire corresponding zone. It is also contemplated that only select ones of the LED lights of each indicator strip may be illuminated simultaneously to only illuminate a portion of the corresponding zone.

As was the case with sensor strips 40, 42, indicator strips 44, 46, 48 are generally flexible members and may assume the general peripheral shape of mannequin head 22. Indicator strips may be mounted to the interior surface of Mannequin head 22 or may be mounted on a separate structure within the interior space of mannequin head 22. Mannequin head 22 may include a plurality of openings or slits so that light produced by LED lights 44a-d, 46a-d, 48a-d, may pass through the wall of mannequin head 22 and be perceived by a user through hair 24.

Each indicator strip 44, 46, 48 may also be used to provide information to the user beyond just illuminating a zone. For example, indicator strips 44, 46, 48 may be designed to blink or change color to convey messages to the user. Indeed, the LED lights of one strip may blink in succession if the user begins to stray out of the intended zone $Z_1$, $Z_2$, $Z_3$. As another example, the lights may change color to indicate to the user that it is time to progress to the next zone.

Figure 3:
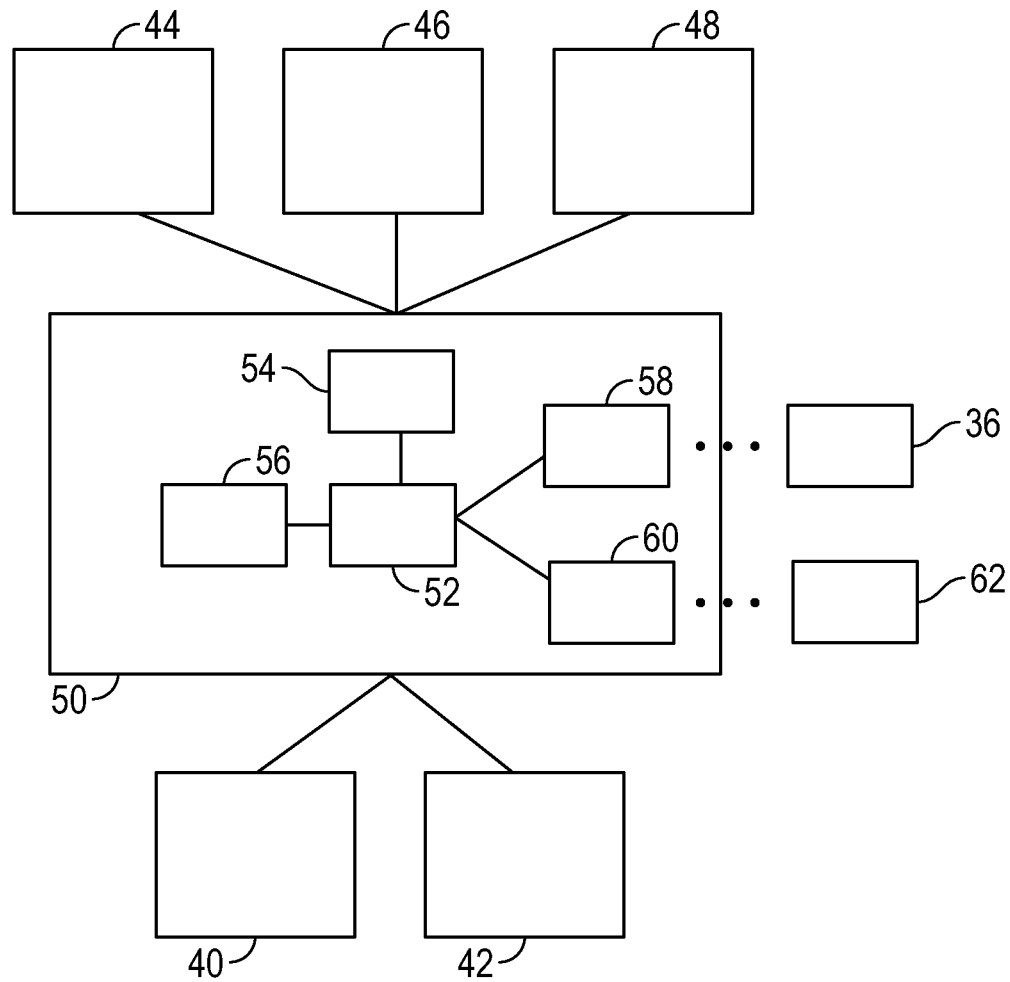
FIG. 3 is a schematic diagram of the interconnection of, and communication between, several components of FIG. 1.

Turning now to FIG. 3, sensor strips 40, 42 and indicator strips 44, 46, 48 are in operative communication with a control arrangement 50. Control arrangement 50 is schematically illustrated in FIG. 3 and includes a central processing unit 52, memory 54, a power source 56, an RFID reader 58, and a wireless transceiver 60. Central processing unit 52 is configured to execute instructions stored in memory 54 to produce the functionality described herein. Central processing unit 52 receives input signals from sensor strips 40, 42, RFID reader 58, and wireless transceiver 60 and produces outputs using indicator strips 44, 46, and 48.

RFID reader 58 receives an RFID signal R (see FIG. 2) produced by an RFID tag affixed to comb 46. It is contemplated that system 20 can be provided with more than one comb 36, and in such an instance each comb will include its own RFID tag to uniquely identify that comb. The use of this RFID scheme is desirable as it allows system 20 to determine whether the user currently has the correct comb attached for a zone $Z_1$, $Z_2$, $Z_3$ (See FIG. 2).

It is contemplated, however, that other comb detection methodologies could be employed. For example, the comb affixed to clipper 26 could be detected by clipper 26, and this information communicated via a wireless signal B (see FIG. 2) produced by clipper 26. Further, comb 36 could be fixed to clipper 26 and movable via an adjustment mechanism of clipper 26. Such a configuration avoids the need for multiple different combs. In such an instance, information pertaining to comb 36 position could be collected by an internal controller and wirelessly communicated via a wireless communication module 62 described below.

Wireless signal B (see FIG. 2) is communicated by a wireless communication module 62 of clipper 26. As already mentioned, this wireless signal may include comb information in some embodiments, and includes information pertaining to the specific position of taper lever 34 as described below. It is also contemplated that different instructions may be loaded into memory 54 corresponding to different haircuts. As such, it is contemplated that an input/output port could also be included to allow for loading new instructions into control arrangement 50.

Figure 4:
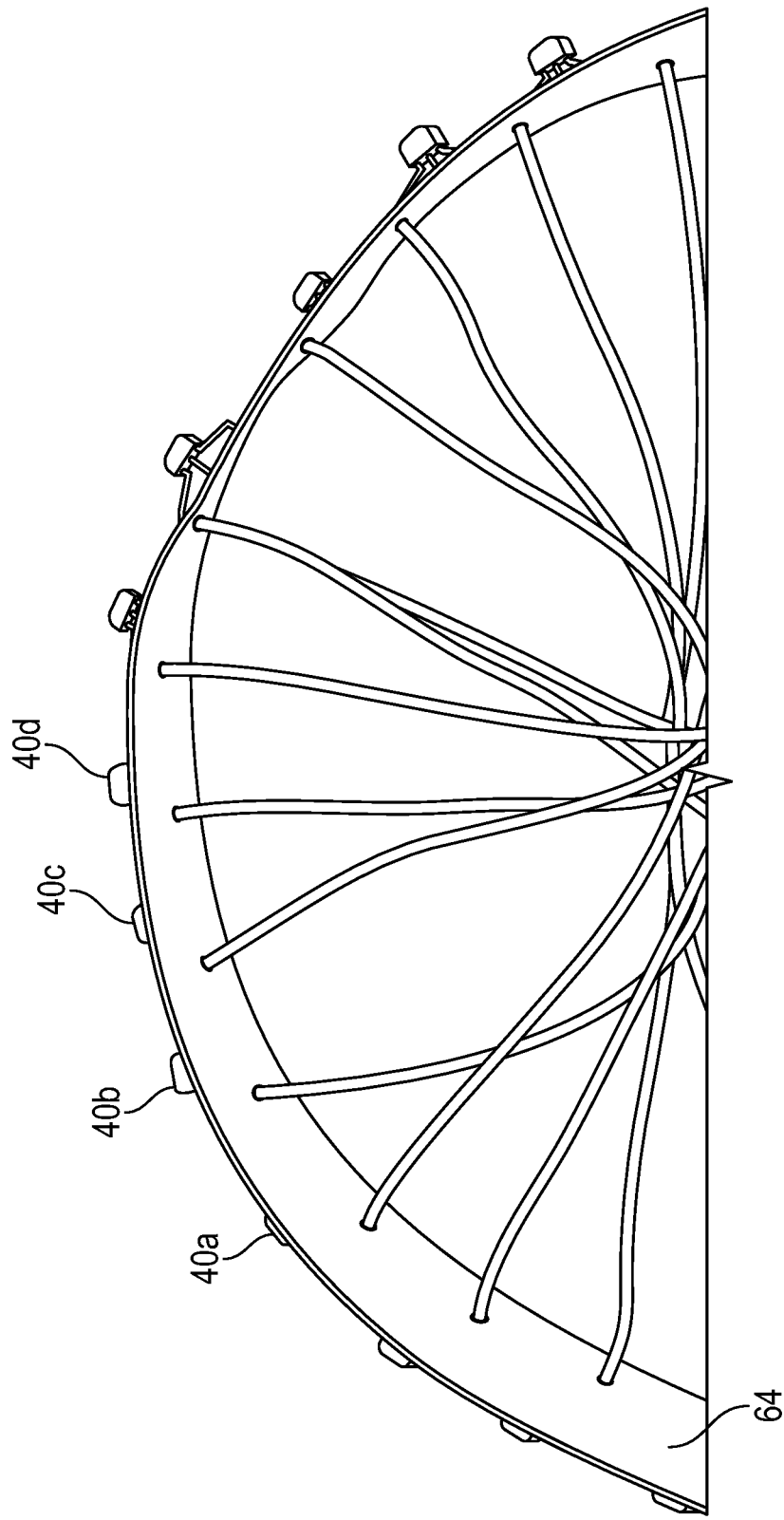
FIG. 4 is a partial top view of a sensor array of the system of FIG. 1.

FIG. 4 is an exemplary illustration of sensor strip 40 and the above described sensors 40a-d mounted to a base 64. Each sensor may be individually wired to control arrangement 50 as is shown, or alternatively the wiring may be bundled and terminated with a plug or the like.

Figure 5:
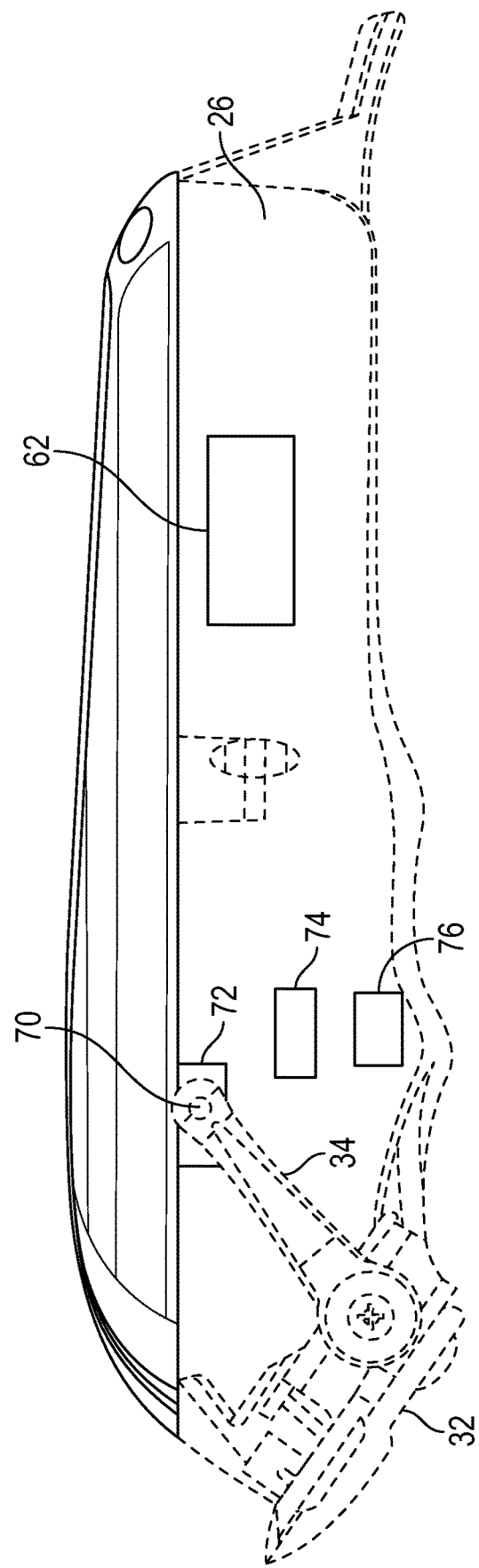
FIG. 5 is a side view of a clipper of the system of FIG. 1.
Figure 6:
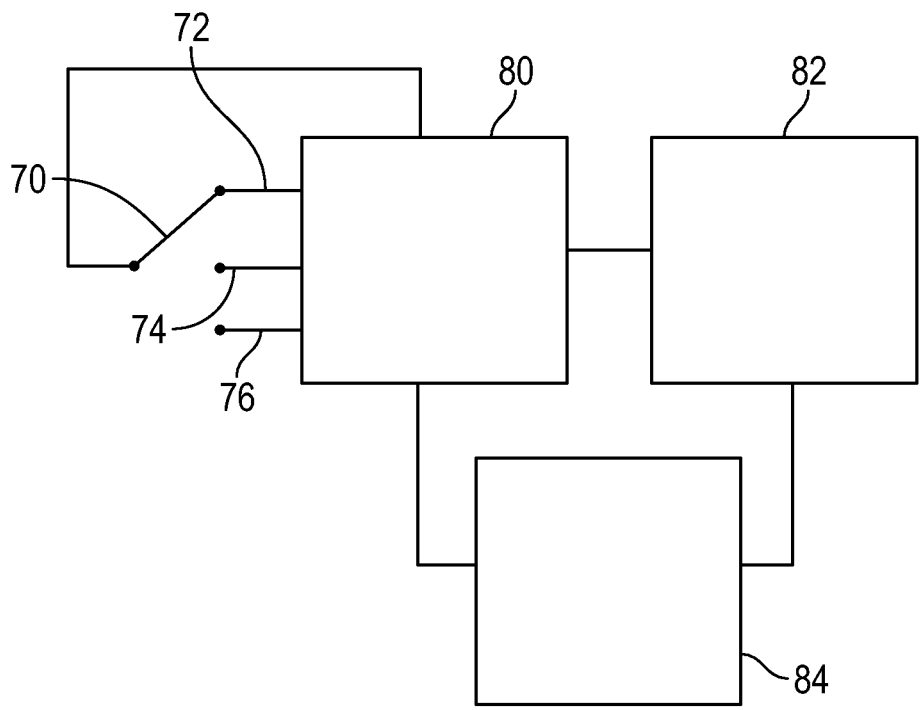
FIG. 6 is a schematic diagram of a taper lever detection arrangement of the system of FIG. 1.

FIG. 5 illustrates a side view of clipper 26. As mentioned above, the specific position of taper lever 34 is detected at clipper 26 and communicated via wireless communication module 62. To detect taper lever position, taper lever 34 includes a pin contact 70 that may be brought into contact with three discrete contacts 72, 74, 76 provided on an outer housing of clipper 26. FIG. 6 illustrates the aforementioned in greater detail.

As can be seen in FIG. 6, wireless communication module 62 includes a controller 80 operable to detect which contact 72, 74, 76 is in contact with contact pin 70. Wireless communication module 62 also includes a transmitter unit 82 configured to send the wireless signal B (see FIG. 2). Communication module 62 may employ any communication protocol, including but not limited to conventional radio, wifi, Bluetooth, etc. Controller 80 and transmitter 82 may be connected to a power supply 84, which may be the existing battery of clipper 26, or the power circuit of clipper 26.

It is also contemplated that taper lever position detection could be achieved via any other configuration useful for position detection. For example, taper lever 34 could be provided with a magnet, and a plurality of Hall effect sensors could be mounted to the housing of clipper 26. As another example, infrared based position detection could also be employed using infrared sensors.

Figure 7:
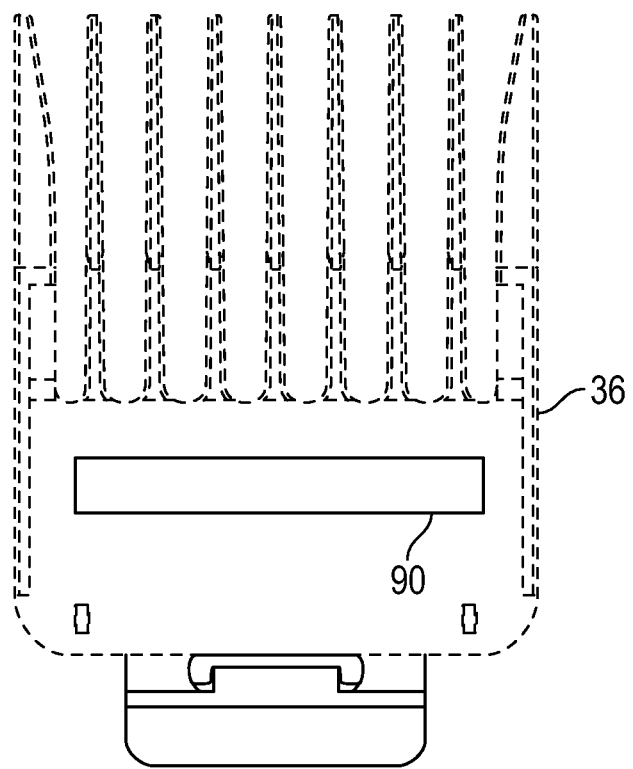
FIG. 7 is a top view of a clipper comb of the system of FIG. 1.

FIG. 7 is an exemplary depiction of a comb 36 including an RFID tag 90 affixed thereto. The positioning of RFID tag 90 is such that it does not disrupt the ability of comb 36 to readily attach to bladeset 32 (see FIG. 2).

Not shown in the figures, but contemplated herein, is a user interface with user manipulated controls. This interface may be embodied as a hardware device on or connected to mannequin head 22. Alternatively, this interface may be embodied as software and presented as an application on another device such as a mobile device. In such an instance, it is contemplated that the device could communicate directly with wireless transceiver 60 (see FIG. 2). Still further, the interface could be configured to receive voice commands from the user.

Having described the structure of system 20, a brief explanation will now be provided as to its operation, referring to all the figures previously discussed. To use system 20, a user must turn system 20 on and initiate a training session using the aforementioned interface. One of zones $Z_1$, $Z_2$, $Z_3$ will then be illuminated providing an indication to the user where to cut hair. System 20 may also provide an indication to the user as to what comb 36 to attach, and to what position taper lever 34 should be set. System 20 will then monitor whether the correct comb 36 is and remains attached, and whether taper lever 34 is and remains in the correct position, while within the instructed zone $Z_1$, $Z_2$, $Z_3$. Once hair cutting in the zone is complete as is indicated by the user via the interface as determined by control arrangement 50 based on historically tracking the positional data of clipper 26, the user will then be directed to the next illuminated zone.

If, however, system 20 detects the user has attached the wrong comb 36, or determined that taper lever 34 is in the incorrect position, the system 20 will provide a warning indication to the user via one or more of indicator strips 44, 46, 48, or via an additional indicator 30 (See FIG. 1). This additional indicator 30 may produce any type of indication, including visual, audible, haptic, etc. The process continues until the user completes the haircut. To repeat this process, a user need only replace hair 24 and restart the program using the interface.

While a particular embodiment of the present system has been described herein, it will be appreciated by those skilled in the art that changes and modifications may be made thereto without departing from the invention in its broader aspects and as set forth in the following claims.

The invention claimed is:

1. An electric hair clipper training system, comprising:
    a housing having hair associated therewith;
    an electric hair clipper for cutting the hair on the housing, said electric hair clipper including a taper lever for adjusting a blade gap between a movable blade and a stationary blade of said electric hair clipper, wherein said taper lever is associated with a taper lever position detection arrangement, said taper lever position detection arrangement comprising a plurality of contacts arranged such that a contact of said taper lever is operable to form an electrical contact with each of said plurality of contacts;
    at least one comb associated with said hair clipper;
    a sensor array for detecting a position of the electric hair clipper relative to the housing;
    an indicator arrangement for indicating different zones of hair on the housing; and
    a control arrangement configured to interpret positional data provided by the sensor array and cause the indicator arrangement to illuminate one or more of said zones of hair on the housing.

2. The system of claim 1, wherein the housing is a mannequin head and includes an interior space, wherein the sensor arrangement and indicator arrangement are contained within the interior space.

3. The system of claim 2, wherein the mannequin head includes a plurality of openings such that light produced by the indicator arrangement can diffuse through an outer wall of the mannequin head.

4. The system of claim 1, wherein the at least one comb includes an RFID tag affixed thereon, for uniquely identifying the at least one comb to an RFID reader of said control arrangement.

5. The system of claim 1, wherein the at least one comb includes a plurality of combs each having an RFID tag uniquely distinguishing the plurality of combs from one another, and wherein the control arrangement is configured to detect which one of said plurality of combs is attached to the electric hair clipper.

6. The system of claim 1, wherein the sensor array includes at least one sensor strip having a plurality of Hall effect sensors mounted on a base of said at least one sensor strip.

7. The system of claim 6, wherein the at least one sensor strip includes a plurality of sensor strips.

8. The system of claim 7, wherein the indicator arrangement includes at least one indicator strip, the indicator strip including a plurality of LED lights mounted on a base of said at least one indicator strip.

9. The system of claim 8, wherein the at least one indicator strip includes a plurality of indicator strips.

10. The system of claim 1, wherein the control arrangement includes a processor, an RFID reader in communication with the processor for receiving an RFID signal from an RFID tag of the at least one comb, and a receiver for receiving a wireless signal from a wireless communication module of the electric hair clipper.

11. The system of claim 10, wherein the wireless signal from the electric hair clipper includes an indication of a taper lever position of a taper lever of the electric hair clipper.

12. The system of claim 11, wherein the control arrangement is configured to compare the wireless signal corresponding to the taper lever position and the RFID signal to the position of the electric hair clipper relative to the mannequin head.

13. A method of providing hair cutting training using a hair clipper training system, the hair clipper training system comprising a housing having hair associated therewith, an electric hair clipper for cutting the hair on the housing, at least one comb associated with said hair clipper, a sensor array for detecting a position of the electric hair clipper relative to the housing, an indicator arrangement for indicating different zones of hair on the housing, and a control arrangement configured to interpret positional data provided by the sensor array and cause the indicator arrangement to illuminate one or more of said zones of hair on the housing, the method comprising:
    illuminating a first zone of hair on the housing using the indicator arrangement;
    detecting whether the electric hair clipper is in proximity to the first zone via the sensor array;
    determining whether a correct comb is attached to the electric hair clipper;
    detecting whether a taper lever of the electric hair clipper is in a correct position; and
    providing an indication, via the indicator arrangement, when the electric hair clipper is not in proximity to the first zone.

14. An electric hair clipper training system, comprising:
    a housing having hair associated therewith;
    an electric hair clipper for cutting the hair on the housing;
    at least one comb associated with said hair clipper;
    a sensor array for detecting a position of the electric hair clipper relative to the housing;
    an indicator arrangement for indicating different zones of hair on the housing; and
    a control arrangement configured to interpret positional data provided by the sensor array and cause the indicator arrangement to illuminate one or more of said zones of hair on the housing, wherein the control arrangement includes a receiver for receiving a wireless signal from a wireless communication module of the electric hair clipper, wherein the wireless signal from the electric hair clipper includes an indication of a taper lever position of a taper lever of the electric hair clipper.

15. The system of claim 14, wherein the control arrangement includes a processor, and an RFID reader in communication with the processor for receiving an RFID signal from an RFID tag of the at least one comb.

16. The system of claim 15, wherein the control arrangement is configured to compare the wireless signal corresponding to the taper lever position and the RFID signal to the position of the electric hair clipper relative to the mannequin head.

17. The system of claim 14, wherein the at least one comb includes an RFID tag affixed thereon, for uniquely identifying the at least one comb to an RFID reader of said control arrangement.

\* \* \* \* \*